Figure 4:
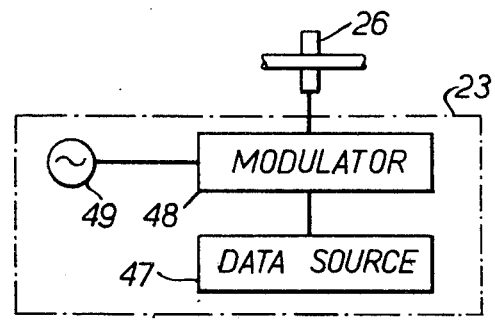

United States Patent [19]

Davies et al.

[11] 4,002,896
[45] Jan. 11, 1977

[54] TELECOMMUNICATION SYSTEM

[76] Inventors: David Evan Naunton Davies, 1 Copper Beach Close, Boxmoor, Hemel, Hempstead, Hertfordshire; Stuart Alexander Kingsley, 43, Rostrevor Avenue, London, both of England

[22] Filed: Jan. 21, 1975

[21] Appl. No.: 543,224

[52] U.S. Cl. .............................. 250/199; 332/7.51; 350/96 WG; 350/161 W
[51] Int. Cl.² .......................................... H04B 9/00
[58] Field of Search ............. 250/199; 178/DIG. 2; 350/96 B, 161, 96 WG, 160 R; 332/7.51; 340/380

[56] References Cited

UNITED STATES PATENTS

| | | | |
|---|---|---|---|
| 3,393,381 | 7/1968 | Thomas et al. | 332/26 |
| 3,573,463 | 4/1971 | Goodwin et al. | 250/199 |
| 3,625,589 | 12/1971 | Snitzer | 350/96 WG |
| 3,645,603 | 2/1972 | Smith | 350/149 |
| 3,781,092 | 12/1973 | Sussman et al. | 350/266 |
| 3,827,000 | 7/1974 | Matsushita et al. | 332/7.51 |
| 3,920,982 | 11/1975 | Harris | 178/DIG. 2 |

OTHER PUBLICATIONS

GTE Lenkurt Demodulator — "Optical Transmission" — Feb., 1972—P3, Regarding Light Sources.

*Primary Examiner*—Robert L. Richardson
*Assistant Examiner*—Marc E. Bookbinder
*Attorney, Agent, or Firm*—Young & Thompson

[57] ABSTRACT

In a telecommunications system employing modulated optical signals, a highway is formed from optical fibers and a source of coherent light or other electromagnetic radiation of an adjacent frequency band is connected to one end of the highway. One or more modulators are connected to the highway at intermediate positions along its length, the or each modulator being arranged to periodically vary the optical path length of the highway. A demodulator is connected to the other end of the highway.

7 Claims, 9 Drawing Figures

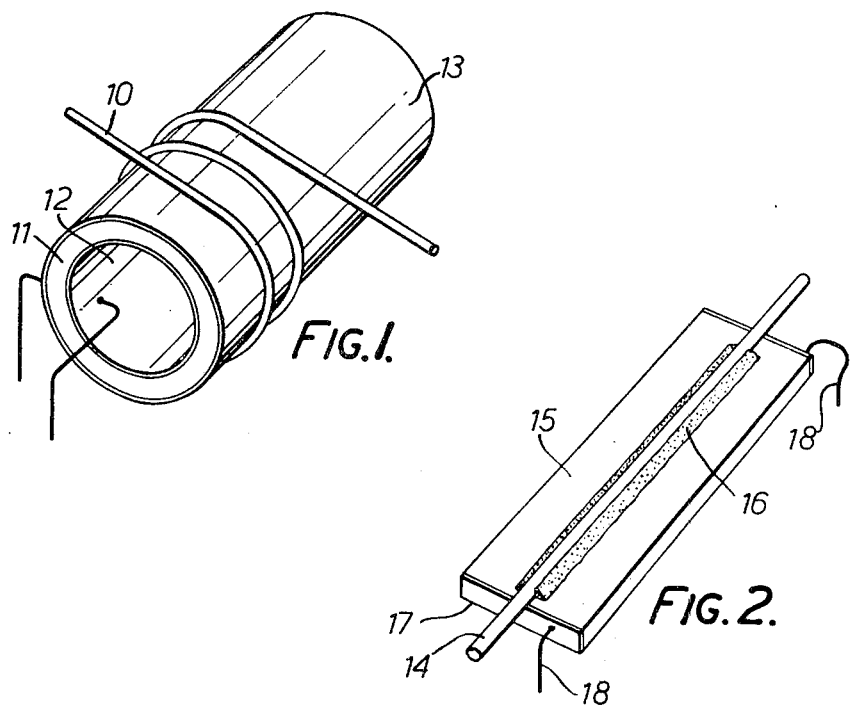
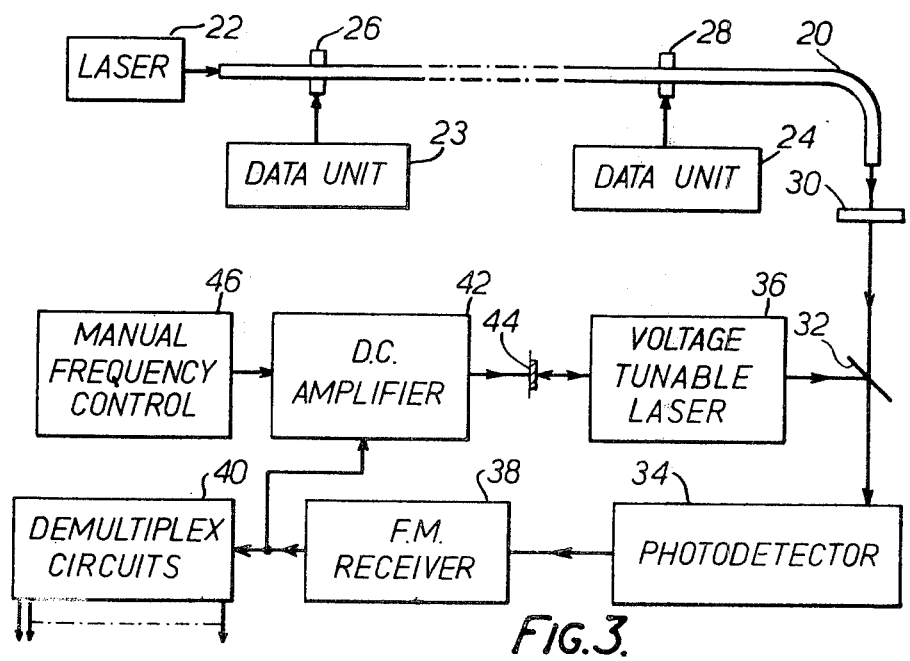

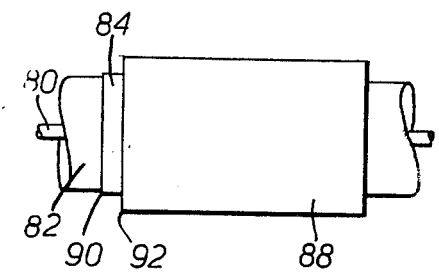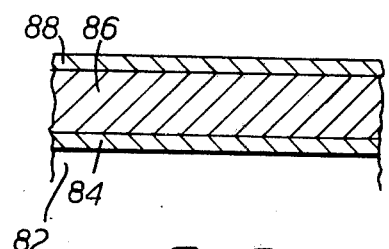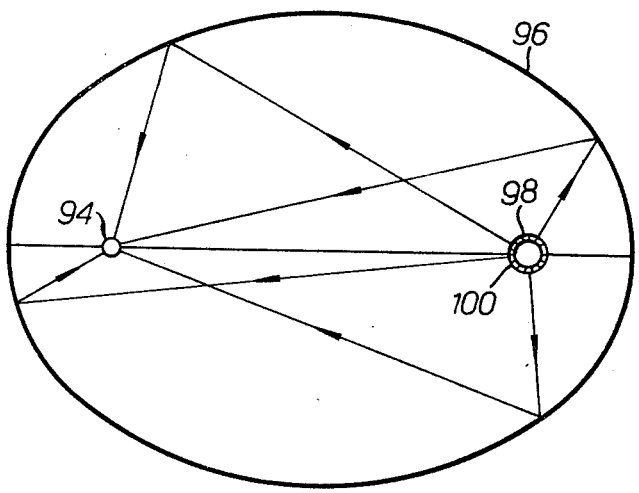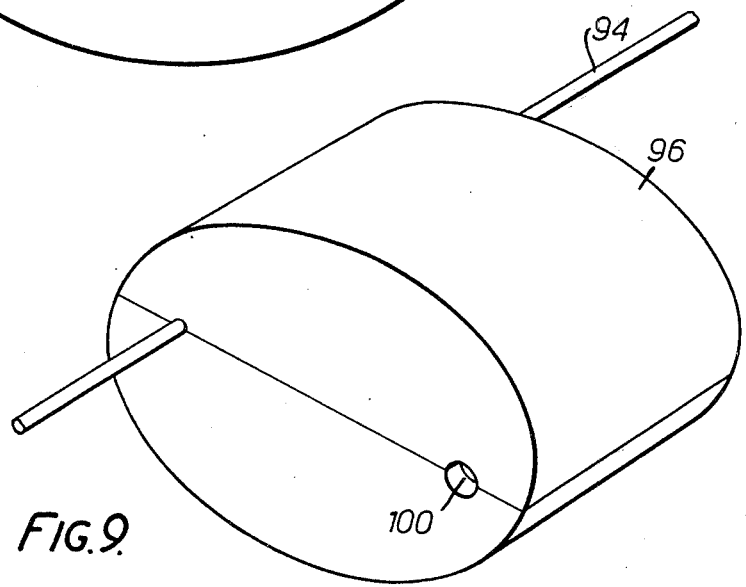

TELECOMMUNICATION SYSTEM

This invention relates to telecommunication systems and has particular application to telecommunication systems employing modulated optical signals.

According to the invention, there is provided a telecommunications system comprising a highway formed from optical fibres, a source of coherent electromagnetic radiation of optical frequency, as hereinafter defined, at one end of the highway, a modulator comprising means for periodically varying the optical path length of the highway located at an intermediate position on the highway and demodulating means connected to the other end of the highway.

The term "electromagnetic radiation of optical frequency" as used herein means visible light and other electromagnetic radiation of adjacent frequency bands which can be handled by the same optical techniques as are used for visible light.

The source of radiation may be a laser or a solid state light source of adequate coherence.

A series of modulators may be provided spaced along a single highway.

The modulator may take the form of means for subjecting a short length of the optical fibre forming the highway to periodic variations of stress in response to a modulating signal. A piece of piezoelectric material may be secured to the fibre for this purpose. The piezoelectric material may be deposited in the form of a thin film on the surface of the fibre.

Alternatively, the modulator may comprise an acoustic lens for focusing acoustic energy on to the outer surface of the fibre.

Figure 5:
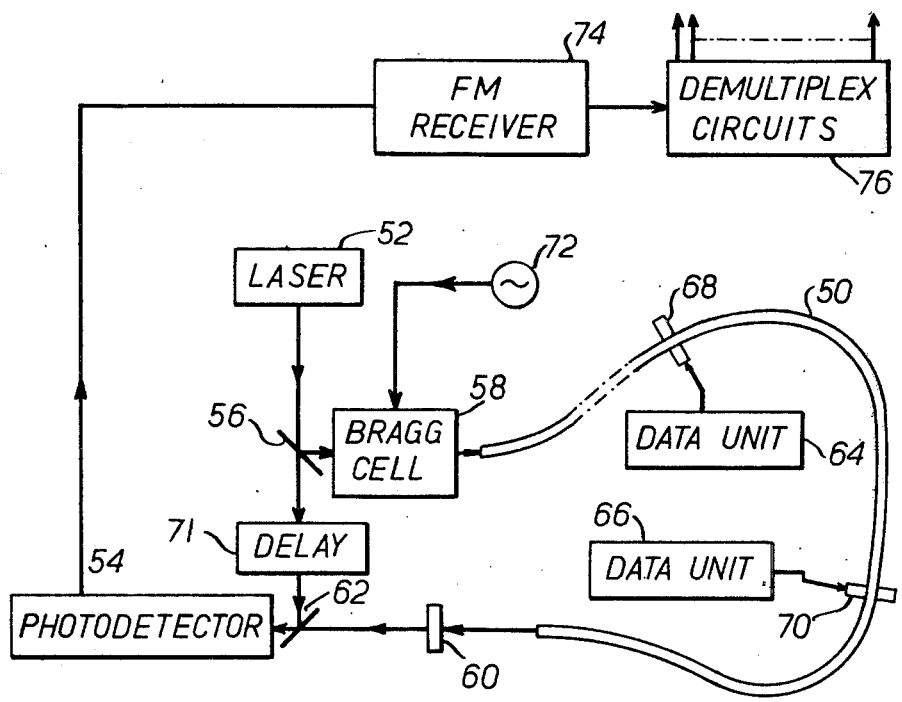

Embodiments of the invention will now be described, by way of example, with reference to the accompanying drawings, in which:

FIG. 1 is a perspective view of a modulating transducer for use in accordance with the invention, FIG. 2 is a perspective view of another kind of modulating transducer for use in accordance with the invention, FIG. 3 is a schematic diagram illustrating a telecommunications system in accordance with the invention, FIG. 4 is a schematic diagram of a data unit for use with the system shown in FIG. 3, FIG. 5 is a schematic diagram of another telecommunications system in accordance with the invention, FIG. 6 is a side view of a further modulating transducer for use in accordance with the invention, FIG. 7 is an enlarged sectional view of part of the transducer shown in FIG. 6, FIG. 8 is a ray diagram illustrating a further form of modulating transducer for use with the invention, and FIG. 9 is a perspective view of the modulating transducer shown in FIG. 8.

If a short length of optical fibre carrying optical signals is subjected to periodic modulation of tension then there will be three predominant effects leading to a change in the phase of the optical carrier, namely a change of length, a change of diameter and a change of refractive index. It can be shown that the effect of the change in diameter is very small (about 0.2percent of the contribution due to change of length) and can be ignored. With this approximation, the relationship between phase retardation $\delta$ of the optical carrier and strain is then given by $$\delta = \frac{2\pi L n}{\lambda} \frac{\sigma}{E} \left(1 - \frac{n^2 p}{2}\right)$$

where
- $L$ = interaction length
- $n$ = refractive index of core of fibre
- $\lambda$ = free space optical wavelength
- $\sigma$ = tensile stress (considered as positive)
- $E$ = Young's modulus
- $p$ = photo-elastic co-efficient $p_{12}$.

It is assumed that the angle between the direction of propagation of optical signals along the fibre and the axis thereof is sufficiently small to allow longitudinal changes in refractive index to be ignored.

FIG. 1 illustrates a transducer for use as a phase modulator in accordance with the invention. An optical fibre 10 is wrapped round a cylinder 11 of a piezoelectric material such as lead-zirconate titanate. The piezoelectric cylinder 11 has electrically conductive films 12 and 13 on its inner and outer cylindrical surface to provide electrodes for applying an electric field so as to cause the outer diameter of the cylinder 12 to vary in accordance with the applied electrical signal. The amount of phase deviation can be increased by increasing the number of turns of the fibre 10 round the cylinder 11.

FIG. 2 illustrates an alternative form of transducer in which an optical fibre 14 is bonded on to a piezoelectric plate 15 by means of adhesive 16. In this case, the plate 15 has electrodes such as 17 on its ends connected to leads 18 so that application of an electrical signal causes its length parallel to the fibre 14 to vary. This form of transducer has the advantage over the transducer illustrated in FIG. 1 that it is possible to add additional transducers to a fibre without disturbing the position of the fibre.

FIG. 3 illustrates a telecommunication system in accordance with the invention. An optical fibre 20 forms a data highway. One end of the fibre 20 is coupled to a single longitudinal mode laser 22 which provides the carrier signal. Spaced along the fibre 20 are data units such as the data units 23 and 24 each of which is connected to a respective transducer 26 and 28 which may be either of the type shown in FIG. 1 or the type shown in FIG. 2. In use, the data units 22 and 24 are supplied with data signals which are used to modulate the carrier signal from the laser 22.

The other end of the optical fibre 20 is coupled via half-wave plate 30 and a beam splitter 32 to a photodetector 34. The beam splitter also allows the output from a voltage tunable laser 36 to impinge on the photodetector 34. The laser 36 also has a single longitudinal mode and produces an output such that its frequency differs by a fixed amount from that of the laser 22. The half-wave plate 30 is adjusted so that the signals from the two lasers 22 and 36 have the same plane of polarisation at the photodetector 34 in order to optimise the output.

The output of the photodetector 34 is connected to an F.M. receiver 38 containing an I.F.. amplifier, limiter, discriminator and integrator to convert the frequency discriminator output to a correct representation of phase modulation. The output of the receiver 38 is connected both to demultiplexing circuits 40 and a d.c. amplifier 42 which controls the tuning element 44 of the laser 36. The d.c. amplifier 42 is also provided with a manual frequency control 46 whereby its output can be set to a particular value when the output of the receiver 38 has zero d.c. component.

In use, the output from the optical fibre 20 consists of the carrier signal from the laser 22 modulated by any signals impressed by the modulators 23 and 24. This output, together with the output from the voltage tunable laser 36 is incident on the photodetector 34 which acts as a heterodyne mixer. The output from the photodetector 34 is applied to the F.M. receiver 38. The output from the F.M. receiver 38 consists of the sum of the modulating signals from the modulators 23 and 24 plus a d.c. pedestal dependent on the frequency difference at the photodetector 34 between the carrier signal from the laser 22 and the output from the voltage tunable laser 36. This d.c. signal is amplified by the amplifier 42 and used to adjust the tuning element 44 of the laser 36 so that the frequencies of the two lasers differ by the I.F. of the receiver 38. The manual frequency control 46 allows the frequency of the laser 36 to be adjusted until it is sufficiently close to the required value for the automatic frequency control loop to operate.

The demultiplex circuits 40 separate the output signals, due to the inputs at the various modulators such as the modulators 23 and 24, from one another.

If it is desired to obtain an output at an intermediate position along the length of the data highway, it is necessary to provide a break in the optical fibre at this point and insert a beam splitter to extract a proportion of the carrier signal. The total number of such intermediate receivers is limited by the loss of signal power due to the removal of a proportion of the signal by each such beam splitter.

FIG. 4 illustrates the data unit 23 in more detail. The output from a data source 47 is connected to one input of a modulator 48 in which it is modulated on to a sub-carrier from an oscillator 49. The output from the modulator 48 is connected to the transducer 26. The other data units are in general similar. However one unit may be arranged to apply base band signals to the highway 20, in which case, of course, no sub-carrier oscillator and modulator are required.

FIG. 5 illustrates an alternative telecommunication system employing an optical fibre 50 as a data highway and having a simplified form of receiving system which can be used when the ends of the fibre 50 can be disposed in proximity to one another. This enables a single laser 52, which can be a multi-longitudinal-mode laser, to be used both to provide the carrier signal for the optical fibre 50 and to provide a reference signal at the input of the photodetector 54. The output of the laser 52, which is plane polarised, is coupled to a beam splitter 56. One beam from the beam splitter 56 is coupled via a Bragg cell 58 to one end of the optical fibre 50. The other end of the optical fibre 50 is connected via a half-wave plate 60 and a beam splitter 62 to the photodetector 54. The optical fibre 50 has data units such as the data units 64 and 66 of the type shown in FIG. 4, with their respective transducers 68 and 70 spaced along its length.

The other beam from the beam splitter 56 is coupled via an optical delay line 71 to the beam splitter 62. The delay line 71, which is arranged to impose a delay on the optical signals which differs from that imposed by the optical fibre 50 by less than the coherence time of the laser 52, may consist of an optical fibre of the same length as the fibre 50 wound as a coil to form a compact unit.

In use, the Bragg cell 58 is supplied with an alternating signal from an oscillator 72. The output from the Bragg cell 58 supplied to the optical fibre 50 has frequency equal to either the sum or the difference between the frequency of the laser 52 and that of the oscillator 72 depending on the orientation of the cell. By suitable adjustment of the half-wave plate 60, the two beams from the beam splitter 56 are arranged to have the same plane of polarisation at the photodetector 54 so that the output signal therefrom consists of a signal at the frequency of the oscillator 72 phase modulated by any modulating signals from the data units 64 and 66.

The output of the photodetector 54 is applied to a F.M. receiver 74 similar to the receiver 38 (FIG. 3) and having intermediate frequency equal to the frequency of the oscillator 72. The output from the demodulator 74 thus consists of the modulating signals from the data units 64 and 66 which are separated from one another by demultiplexing circuits 76 similar to the demultiplexing circuits 40.

The system illustrated in FIG. 5 may be modified to enable it to be used in circumstances when the ends of the fibre 50 cannot conveniently be disposed in proximity to one another while preserving the advantage of using only one laser. The delay line 72 is formed from an optical fibre of the same length as the fibre 50 but, instead of winding this second fibre into a compact coil, it is disposed in close proximity to the fibre 50 for most of the length of the latter, only being separated therefrom at the locations of the modulating transducers such as 68 and 70 so as not to be affected by such transducers. This has the advantage that the two fibres are subject to the same environmental conditions along their length so that any noise produced, for example by temperature variations or vibration, is present in both optical signals incident on the photodetector 54 and is thus at least partially cancelled.

Referring to FIGS. 6 and 7, another form of modulating transducer may be provided by depositing a thin film of piezoelectric material on an optical fibre, for example by evaporating. FIG. 6 shows an optical fibre 80 covered by a protective cladding 82 of plastics material. A thin film 84 of electrically conductive material is then deposited on the cladding 82 in the region where the transducer is required. A thin film 86 of piezoelectric material is then deposited on the film 84, one end region of the film 84 being masked during deposition of the piezoelectric film 86 to leave an exposed area to which an electrical connection can be made. A further thin film 88 of electrically conductive material is then deposited on the outside of the film 86 of piezoelectric material. Thus the cladding 82 and the films 84, 86 and 88 form a series of concentric cylinders. Leads 90 and 92 are connected to the electrically conductive films 84 and 88 respectively to enable an electric field to be applied to the piezoelectric material. This is effectively a cylindrical line focus transducer.

Another form of transducer, in which acoustic waves are focused on to the outer surface of an optical fibre 94 is illustrated in FIGS. 8 and 9. A body of material having a high acoustic impedence, such as a metal, of elliptical cross-section is disposed with the fibre 94 at one focus. A cylindrical hole is provided at the other focus to accommodate two half cylinders 98 and 100 of piezoelectric material, each half cylinder having electrodes on its inner and outer surfaces. The body 96 is preferably formed in two symmetrical parts so that it can readily be clamped on to the fibre 94 at any required position along the length thereof. An appropriate acoustic coupling fluid may be used at all acoustic interfaces. In use, acoustic waves are radiated by the half cylinders 98 and 100 and reflected off the outer surface of the elliptical body 96 on to the fibre 94 at the other focus. The material of which the material 96 is chosen to be sufficiently lossy to ensure that any acoustic waves reflected back from the optical fibre 94 to the transducers 98 and 100 and then back again to the fibre 94 will be sufficiently attenuated to cause a negligible amount of echo. The more lossy the material, the better the signal to echo ratio but the resulting attenuation of course reduces the strength of the main signal.

The body 96 of elliptical cross-section may be replaced by a similar body of perabolic cross-section with the fibre 94 disposed at its focus and plain piezoelectric transducers disposed on flat surface perpendicular to the axis of the parabola and confronting the focus.

The transducers shown in FIGS. 6 to 9 differ from those shown in FIGS. 1 and 2 in that the optical fibres are radially compressed instead of being axially stretched. A comparable phase retardation effect is produced. In general, satisfactory results can be obtained with any mechanical stress applied to the fibre provided that the resulting strain is symmetrical about the axis of the fibre. In other words, if the shape of the fibre is distorted, the fibre becomes birefringent. A modulator which had the effect of producing variable birefringence in the fibre would, effectively, be imposing polarisation modulation. The effect of two such polarisation modulation steps in cascade would be to introduce cross-talk between the two channels concerned when the output from the fibre is subject to phase demodulation.

A particular advantage of the invention is that the use of non-coherent phase modulation means that the effects of noise and vibration of the fibre and transducers are restricted to low frequencies i.e. up to about 10 kHz, and so have no effect on signals operating at higher sub-carrier frequencies.

In all embodiments of the invention, it is preferable to use a single mode optical fibre propagating the $HE_{11}$. This is not essential but the efficiency of demodulation decreases as the number of modes increases.

What is claimed is:

1. A telecommunications system comprising a highway formed from an optical fibre, a source of coherent electromagnetic radiation of optical frequency connected to one end of the highway via a Bragg cell responsive to an oscillator, a modulator comprising means for periodically varying the optical path length of the highway located at an intermediate position on the highway, an optical delay line of path length differing from that of the highway by less than the coherence time of the source of electromagnetic radiation, connected to the source of electromagnetic radiation and a demodulator responsive to said highway and said delay line comprising a photodetector and F.M. receiver having intermediate frequency equal to that of the oscillator supplying the Bragg cell, there being provided means for adjusting the plane of polarisation of the beam from said highway and said delay line so that both beams have the same plane of polaristation at the photo-detector.

2. A telecommunications system as claimed in claim 1, in which the delay line comprises an optical fibre of the same length as the highway and disposed in proximity thereto.

3. A telecommunications system comprising a highway formed from an optical fibre, a source of coherent electromagnetic radiation of optical frequency at one end of the highway, a modulator comprising a source of acoustic energy and a body of material having a high acoustic impedence adapted to focus acoustic waves on to the surface of the fibre at an intermediate position on the highway, and demodulating means connected to the other end of the highway.

4. A telecommunications system as claimed in claim 3, in which the body of material having a high acoustic impedance is of elliptical cross-section with the fibre disposed at one focus and a source of acoustic energy disposed at the other focus.

5. A telecommunications system as claimed in claim 3, in which the body of material having a high acoustic impedance is of parabolic cross-section with the fibre disposed at the focus of the parabola and the source of acoustic energy is planar and is disposed in a plane perpendicular to the axis of the parabola.

6. A telecommunications system comprising a highway formed from an optical fibre, a source of coherent electromagnetic radiation of optical frequency at one end of the highway, a modulator comprising a cylinder of piezoelectric material round which the fibre is wrapped, said modulator being located at an intermediate position on the highway, and demodulating means connected to the other end of the highway.

7. A telecommunications system as claimed in claim 6, including a plurality of modulators spaced along the highway, each modulator having associated means for applying a respective distinct data signal to the highway either modulated on to a respective sub-carrier or at base band frequency.

* * * * *